Feb. 7, 1967   A. CZAPEK   3,302,291
PHOTOGRAMMETRIC PLOTTER
Filed March 23, 1964   2 Sheets-Sheet 2

3,302,291
PHOTOGRAMMETRIC PLOTTER
André Czapek, Le Perreux, France, assignor to Societe
d'Optique et de Mecanique de Haute Precision, Paris,
France, a company of France
Filed Mar. 23, 1964, Ser. No. 353,715
Claims priority, application France, Mar. 26, 1963,
929,216
3 Claims. (Cl. 33—20)

This invention relates to a photogrammetic plotter using an electromechanical drive.

In plotting machines the conventional practice is to reproduce the geometric relationships of the original photography to a certain scale. Such direct actuation however, has certain difficulties originating from the inclination of the moving elements actuating the carrier plates, the balancing of the moving parts, and the guiding of the plates in a fixed plane through the agency of appropriate devices. In every case the rods representing the homologous rays have to overcome appreciable resistance and consequently the precision of the mechanism is less than would be expected with direct actuation.

It is also a well known fact that the precision of the spatial mechanisation alters when the rod inclination angles become appreciable, as is particularly the case with the plotting of photographs taken with wide-angle lenses.

The machine according to the present invention is intended to retain the simplicity of direct actuation while obviating the above disadvantages, particularly as regards balancing and angular limitation.

This machine comprises two rods representing the homologous rays of two photographs, carriages for moving the point forming the terrain plotting point, a main Cardan joint associated with each rod and through the centre of which the rod passes, a binocular eyepiece for observation of the two photographs, and photograph carriages the said machine comprising first the system comprising the plotting point carriages, the homologous rods and the main Cardan joints, and secondly a stereocomparator provided with carriages for moving each photograph in two mutually perpendicular directions beneath a binocular observation eyepiece, teletransmissions being provided between the centre points of the Cardan joints and the photograph carriages.

The invention will now be described in greater detail with reference to one particular embodiment given by way of example and illustrated in the drawings wherein.

Figure 1:
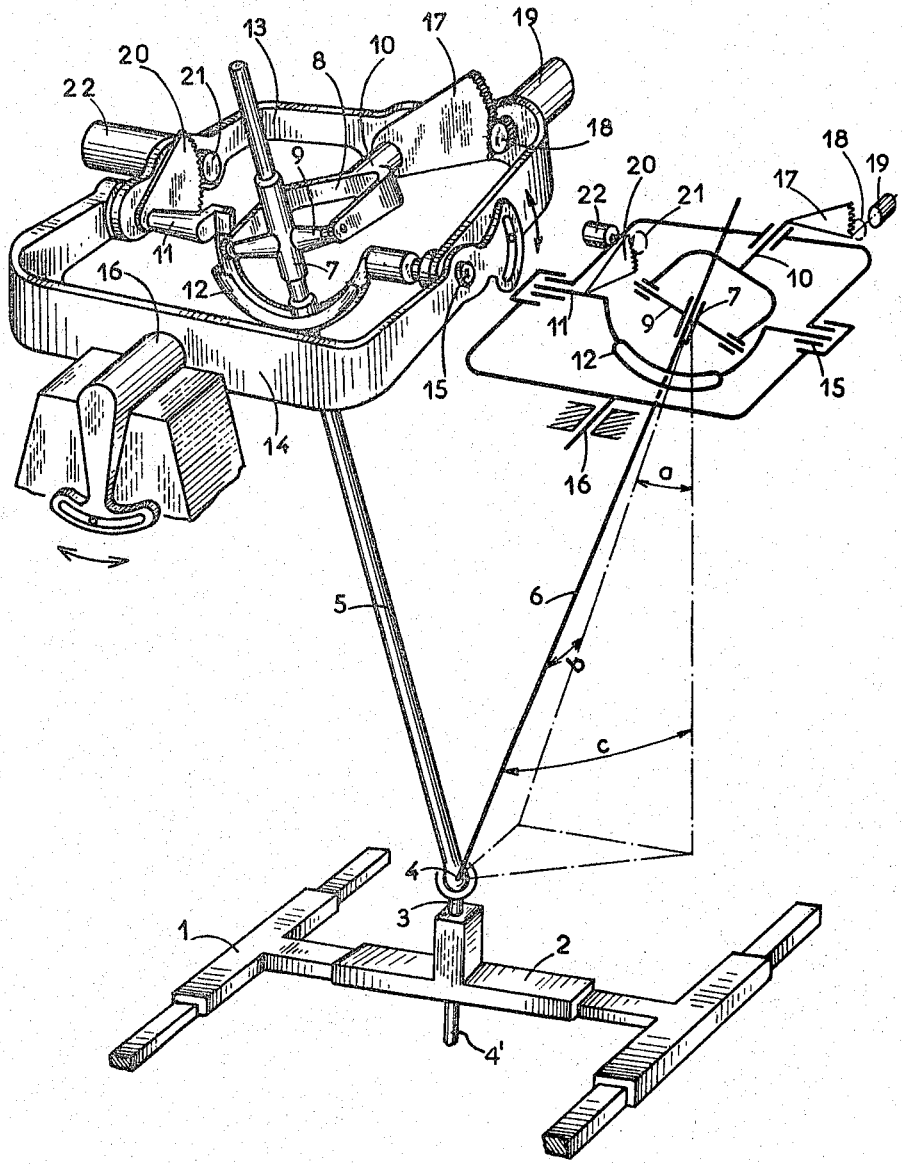
FIGURE 1 is a perspective view showing the carriages embodying the terrain point and the two rods representing the homologous rays, one of the rods and its articulation being represented diagrammatically.

In FIGURE 1, the bottom part, which is generally known as a coordinatograph, is of a conventional type. It comprises horizontal crossed carriages 1 and 2 and a vertical carriage 3 for movement of the point 4 which forms the terrain plotting point at 4′. This point 4 receives the universal articulation of the two rods 5 and 6 representing the homologous rays relative to that point.

At the top of the machine are disposed the two inclination detector Cardan joints. The two Cardan joints are identical and can be disposed in suitable relationship to one another for embodying the respective position of the two viewpoints, these viewpoints being the points of universal articulation of the rods.

In the left-hand Cardan joint, the rod 5 is mounted slidably in a sleeve 7 articulated on a fork 8 about an axis 9. The pivot axis 10 of the fork 8 constitutes one of the primary axes of the Cardan joint.

The second primary axis 11 of the Cardan joint is perpendicular to the first.

The rod 5 passes between the teeth of a fork 12 rigidly connected to the second primary axis 11.

When the rod 5 is moved during movements of the point 4, it determines the rotation of the first primary axis by the fork 8 and the rotation of the second primary axis by the fork 12.

The two axes 10 and 11 are mounted for rotation in a cradle 13 (sight cradle) which pivots in another cradle 14 (convergence cradle) so that the pivoting movements of the two cradles about perpendicular axes 15 and 16 passing through the viewpoint and constituting a second Cardan joint provide the conditions for restitution of the photograph in question, i.e. enable the plane of the axes of the first Cardan joint to be brought into parallel relationship to that of the imaginary photograph.

An angle detector 19 intended for teletransmission to the second part of the machine, is actuated by the primary axis 10 through an angle multiplier formed by a gear sector 17 and a gear wheel 18.

Similarly, an angle detector 22 is actuated by the primary axis 11 via a gear sector 20 and a gear wheel 21.

The inclination (angle C) of the rod 6 to the normal to the imaginary photograph can be split up into two component inclinations (angles $a$ and $b$) by projection of the rod onto two perpendicular vertical planes, one of which passes through the two viewpoints, i.e., the centres of the first Cardan joints (primary axes 10 and 11) and the other of which is perpendicular to the former and passes through the centre of the first Cardan joint corresponding to the rod 6.

The inclination of the rod 5 can be split up in the same way.

If the photograph was taken with a lens of focal length $f$, the values $f \tan a$ and $f \tan b$ form the right-angled coordinates of the image of a terrain point on the photograph from the centre thereof.

Figure 2:
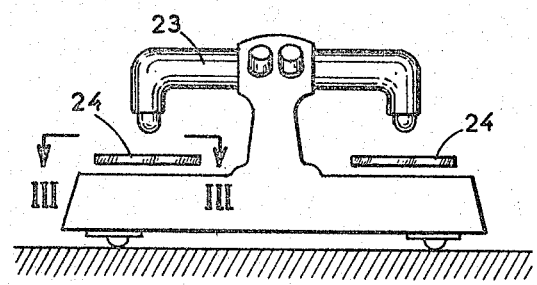
FIGURE 2 is an elevation of the machine stereocomparator.
Figure 3:
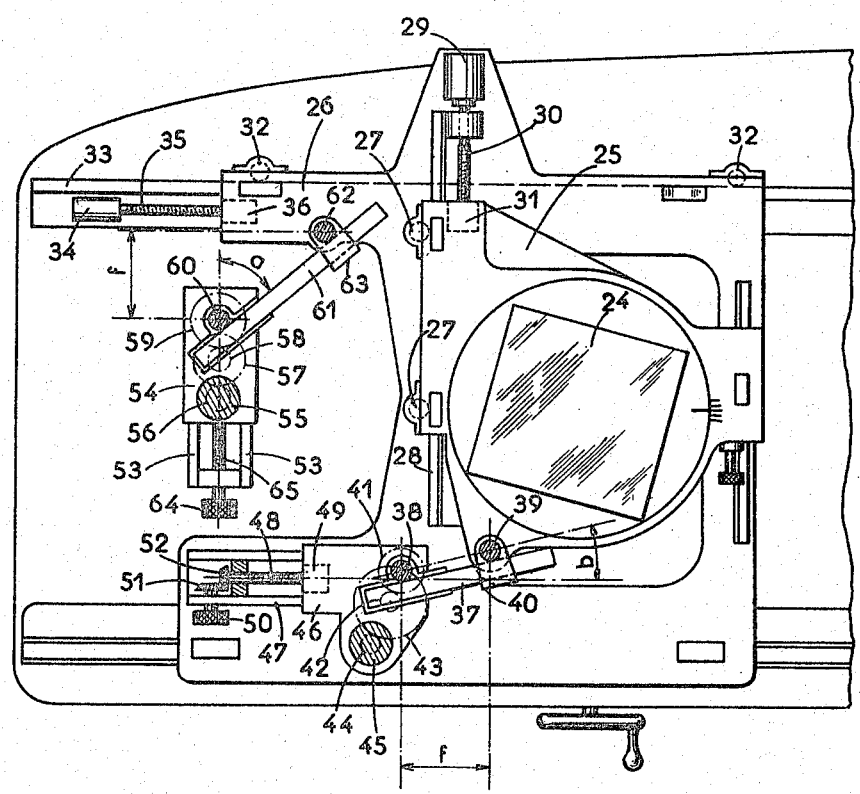
FIGURE 3 is a view in the direction III—III in FIGURE 2.

FIGURES 2 and 3 show the stereocomparator making up the second part of the machine. It comprises a binocular eyepiece 23 for example of the conventional type, disposed above the photographs 24. Each photograph 24 is carried by a carriage 25 on which it can be oriented to allow for tilt.

Carriage 25 slides on a second carriage 26 moving perpendicularly to the first carriage.

Carriage 25 is provided with rollers 27 running on a bar 28 rigidly connected to the carriage 26, and a motor 29 can rotate a screw 30 engaging a nut 31 borne by the carriage 25. Rotation of the screw 30 moves the carriage 25.

Carriage 26 is provided with rollers 32 running on a bar 33 rigidly connected to the stereocomparator frame. A motor 34 can drive a screw 35 engaging a nut 36 rigidly connected to carriage 26. Rotation of the screw 35 moves the carriage 26.

Carriage 26 also bears a bar 37 adapted to pivot and to drive a vertical spindle 38. Bar 37 bears on a pivot 39 on the carriage 25, against which it is guided by a yoke 40. Pivot 38 is rigidly connected to a gear wheel 41 which is connected via a gear train 42 to 44, to the pivot of an angle comparator 45.

Bar 37, angle comparator 45 and the corresponding gear train are mounted in an auxiliary carriage 46 adapted to move on guides 47 rigidly connected to the carriage 26 perpendicularly to the bar 28. The auxiliary carriage 46 can also be moved manually via a screw 48 engaging a nut 49 borne by carriage 46 and controlled by a knob 50 via a level gear 51 and 52.

The stereocomparator frame bears guides 53 over which moves a carriage 54 provided with an angle comparator 55 driven by a gear train 56 to 59, gear wheel 59 being rigidly connected to a spindle 60 rotatable by a bar 61. Rotation of the latter is produced by a pivot 62 borne by the carriage 26 and against which it is guided by a yoke 63.

A knob 64 is adapted to rotate a screw 65 controlling the movement of the carriage 54 on its guides 53.

By means of angle multipliers formed by the two gear trains 41 to 44 and 56 to 59, the pivoting movements of the bars 37 and 61 drive the angle comparators 45 and 55, the ratios of the angle multipliers being the same as those of the multipliers 20, 21, and 17, 18 respectively.

The knobs 50 and 64 permit of adjustment of the positions of the carriages 46 and 54 so that the projection of the distance between the spindle 38 and the pivot 39 on to a perpendicular to the bar 28, and the projection of the distance between the spindle 60 and the pivot 62 on to a perpendicular to the bar 33 are both equal to the focal length $f$ of the photograph taking lens.

Finally, electric controls are provided between the angle detectors 19 and 22 and the motors 34 and 29 for the movements of the carriages 26 and 25 on rotation of the rods 5 and 6, the angle comparators 55 and 45 stopping the motors 34 and 29 when the bars 61 and 37 respectively form angles $a$ and $b$ with the directions perpendicular to the bar 33 and to the bar 28 respectively.

The above described machine operates as follows:

On movement of point 4, rods 5 and 6 pivot about the centres of the Cardan joints 10, 11, the angle detectors produce rotation of the motors 34 and 29, and the bars 61 and 37 pivot until the angles formed by these bars with the perpendiculars to the bars 33 and 28 are equal to $a$ and $b$. The angle comparators 55 and 45 then stop the motors 34 and 29.

The pivoting angles of the bars 61 and 37 are thus in keeping with the component angles $a$ and $b$ of the inclination of the corresponding rods 5 and 6, and each of the photographs moves in two perpendicular directions, by the distances $f \tan a$ and $f \tan b$.

From his position of observation, the operator actuates the various controls of the coordinatograph shown in FIGURE 1 by means of mechanical or electric teletransmissions.

The apparatus according to the invention operates very simply and the following will be noted:

The orientation of the photograph on taking may be reconstituted in the plotting machine by an identical orientation of the plane of the primary axes of the rod articulation Cardan joint.

The bar mechanism 61 and 37 of the comparator permits appreciable inclination angles for the rods 5 and 6 since the bar is turned by the carriage and not vice versa.

During their movements the rods and the comparator bars have to overcome only small resistances and inertia (of the detector systems and angle comparators).

The photograph carriages are in fixed horizontal planes irrespective of the orientation of the photographs in space on taking, and hence they require no balancing.

The precision of the machine is constant irrespective of the field angle.

Wide angle lenses can be used for the photographs.

The observation optical system is stationary and one of the resultant advantages in particular is that distortion can be corrected mechanically.

The invention is naturally not limited to the details of the embodiment described hereinbefore, for example the rods 5 and 6 could be moved apart in known manner, said rods 5 and 6 being connected to the point 4 by articulated systems. Moreover, the second Cardan joints 13 and 14 could be mounted for relative displacements to allow for the differences in the photographs taken by the aircraft from which the photographs were made.

I claim:

1. An electromechanical photogrammetric plotting machine for two photographs comprising a first system including two intersecting rods representing the homologous rays of said two photographs, a terrain plotting point adjacent the intersection of said rods, carriages connected to said rods adjacent said terrain plotting point for moving said terrain plotting point, said rods and said carriages being universally connected at the intersection of said rods and said plotting point being connected to one of said carriages, a main Cardan joint having two axes at right angles for each of said rods and through the center of which the respective one of said rods slidably passes and a stereocomparator second system independent of said first system including a binocular eyepiece for observation of said two photographs, a photograph carriage for and mounting each of said two photographs, means for moving each of said carriages in two mutually perpendicular directions beneath said binocular eyepiece and teletransmission means connected between said Cardan joints and said photograph carriages, each of said main Cardan joints being mounted in a second Cardan joint having the same center.

2. A machine as described in claim 1, said stereocomparator second system comprising two sub-carriages for each of said photograph carriages, motors for moving said two sub-carriages in two mutually perpendicular directions beneath said eyepiece, a bar pivoting about an axis for each of said sub-carriages whose pivoting movements are controlled by bearing on the respective one of said sub-carriages and angle comparators compriang the angles of rotation of said bars with the angles of rotation of said axes of said main Cardan joints and stopping said motors when said angles are equal.

3. A machine as described in claim 2 including angle multipliers having the same degree of multiplication between each of said main Cardan joint axes and the corresponding one of said angle detectors and between the pivot axis of each of said bars and the corresponding one of said angle comparators.

References Cited by the Examiner

UNITED STATES PATENTS

| | | | |
|---|---|---|---|
| 2,574,123 | 11/1951 | Santoni | 33—20 X |
| 2,803,992 | 8/1957 | Baboz | 33—20 X |
| 3,088,209 | 5/1963 | Schwidefsky et al. | 33—20 |
| 3,170,238 | 2/1965 | Yzerman | 33—20 |

FOREIGN PATENTS

| | | |
|---|---|---|
| 953,250 | 5/1949 | France. |
| 962,250 | 12/1949 | France. |
| 1,175,700 | 11/1958 | France. |

LEONARD FORMAN, *Primary Examiner.*

ISAAC LISANN, *Examiner.*

H. N. HAROIAN, *Assistant Examiner.*